Figure 1:
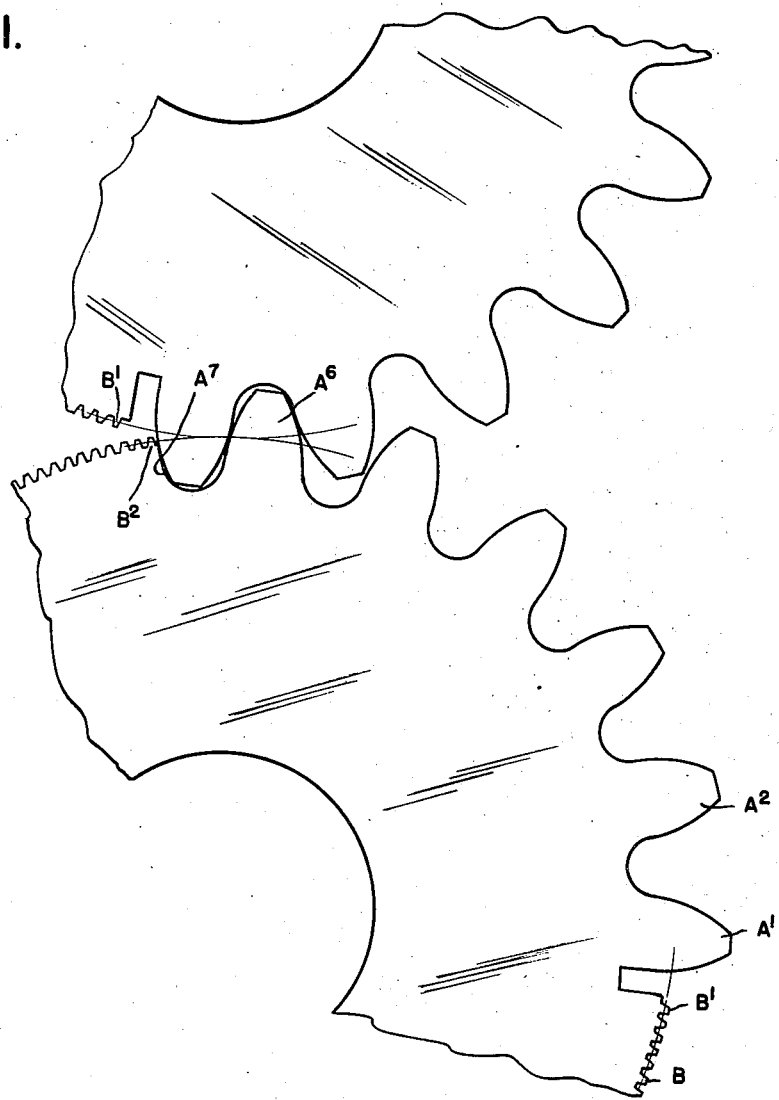

Jan. 5, 1943.  A. WALDMAN  2,307,651
METHOD FOR FINISHING GEARS HAVING TEETH DIFFERING IN
CIRCULAR PITCH IN DIFFERENT SEGMENTS THEREOF
Filed Nov. 3, 1941  2 Sheets-Sheet 1

FIG.I.

INVENTOR.
ALFRED WALDMAN
BY Whittemore Hulbert & Belknap
ATTORNEYS

Jan. 5, 1943.  A. WALDMAN  2,307,651
METHOD FOR FINISHING GEARS HAVING TEETH DIFFERING IN
CIRCULAR PITCH IN DIFFERENT SEGMENTS THEREOF
Filed Nov. 3, 1941  2 Sheets-Sheet 2

INVENTOR.
ALFRED WALDMAN
BY
*Whittemore Hulbert + Belknap*
ATTORNEYS

Patented Jan. 5, 1943

2,307,651

UNITED STATES PATENT OFFICE 2,307,651

METHOD OF FINISHING GEARS HAVING TEETH DIFFERING IN CIRCULAR PITCH IN DIFFERENT SEGMENTS THEREOF

Alfred Waldman, Detroit, Mich., assignor to The Gear Grinding Machine Company, Hamtramck, Mich., a corporation of Michigan Application November 3, 1941, Serial No. 417,702

3 Claims. (Cl. 51—287)

The invention relates to the finishing of gears of that type having teeth of different circular pitch, but of the same pitch diameter, in different segments thereof. Such gears are useful where heavy loads are to be transmitted through a portion of the cycle and only light loads during the remaining portion of the cycle, the angular velocity being uniform.

The invention relates more particularly to a method and apparatus for grinding such type of gears, but in its broader aspect it is applicable to other means than grinding, for finishing the gears.

The basic conditions for grinding teeth of a gear having different circular pitches are:

First, the pitch line or pitch diameter must be the same for all of the teeth;

Second, the pressure angles must be the same; and

Third, the circular pitch for the larger tooth must be an exact multiple of the circular pitch for the smaller tooth.

It is therefore the object of the invention to maintain these conditions and also to provide for exactly fashioning the contour of both the large and the small teeth.

It is a further object to accomplish this result by the use of formed grinder wheels which are retrimmed from time to time to maintain the exact form.

With these objects in view, the invention consists in the method and apparatus as hereinafter set forth.

Figure 2:
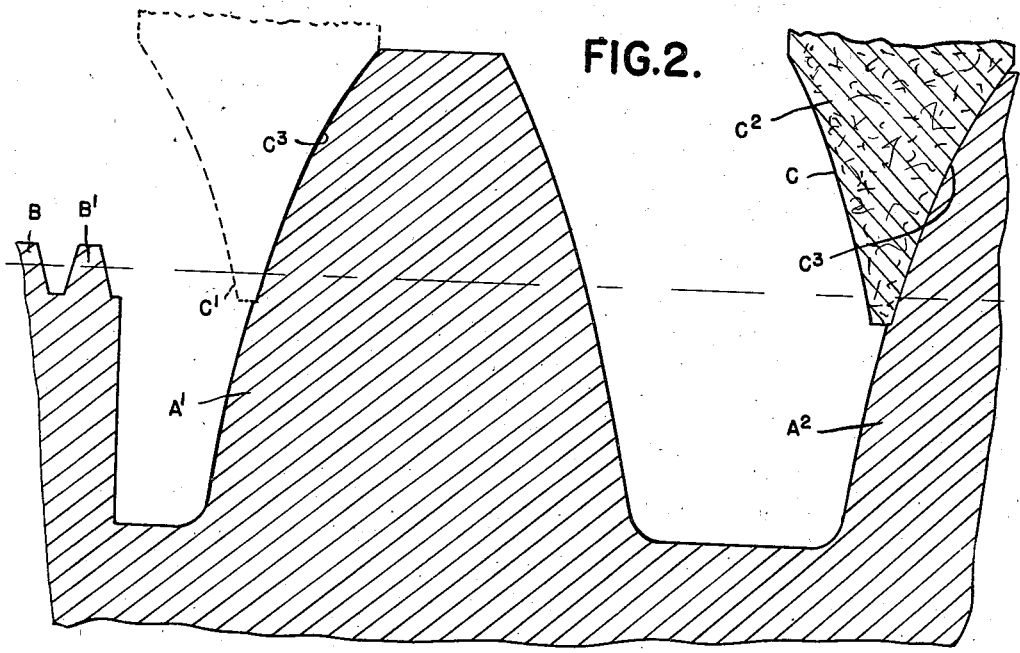
Figure 3:
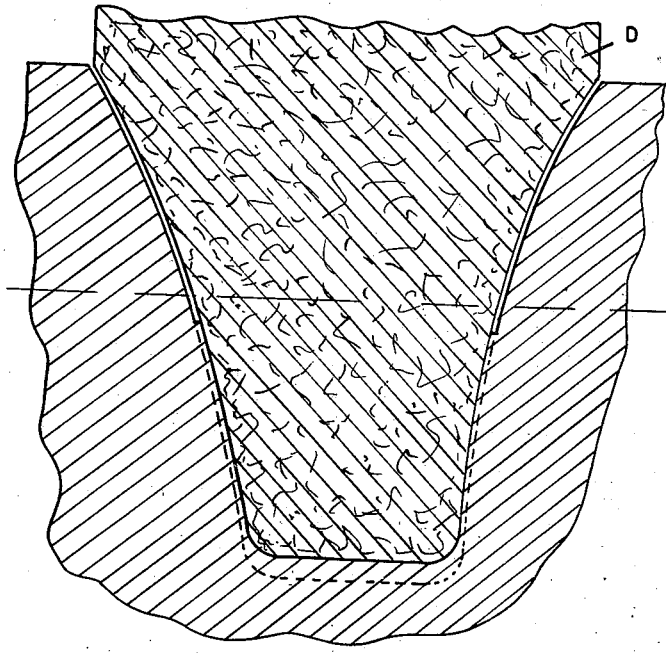

In the drawings:

Fig. 1 is an elevation of a gear wheel having teeth of different size in different segments thereof;

Fig. 2 is a diagram illustrating the relation of the small and large teeth to each other and, for simplicity, representing the pitch line as rectilinear; also showing the grinder wheel for the smaller teeth in engagement with an addendum surface of one of the larger teeth; and Fig. 3 is a similar diagram showing the grinder wheel for the larger teeth in indexed position, but prior to the grinding of a pair of said teeth.

The specific form of gear which is represented in Fig. 1 has six teeth A', A², etc., of 2 circular pitch, 10 inch pitch diameter (20 teeth in full circle), and teeth B of 20 circular pitch, 10 inch pitch diameter (200 teeth in full circle). Also, the pressure angle equals 14½°. The circular pitch of the large teeth is therefore an exact multiple of that of the small teeth, being ten times greater. In order that such gear may properly mesh with the mating gear, it is essential that the large tooth at one end of the segment containing such teeth should be spaced from the first small tooth so as to receive a large tooth of the mating gear. On the other end of the segment, the large and small teeth might be directly adjacent, but it is unnecessary that the small teeth should extend beyond a distance from the adjacent large tooth which is one-half the large interdental space. Thus, as shown, the last small tooth B' is spaced one-half of a large interdental space from the adjacent large tooth A', while at the opposite end of the large tooth segment, the tooth A⁶ is spaced from the small tooth B² by a complete large toothed interdental space A⁷.

One difficulty in the grinding of the teeth of such a gear by formed grinder wheels is that a grinder trimmed to the interdental contour of the large teeth could not be used for grinding the outer surface of the tooth A'. This is for the reason that the tooth B' would stand in the path of such grinder wheel and prevent it from coming into operative relation to the tooth A'.

Another difficulty is that where the small teeth are ground by one formed wheel and the large teeth by a different formed wheel, it is difficult to limit the radial inward movement of the last-used grinder wheel so as to exactly correspond to the radial inward limit of the first-used grinder wheel. Such difficulties I have overcome by my improved method and apparatus, as follows:

The apparatus which I employ for grinding such gears has the usual elements of a gear grinding machine, including the work holder, indexing mechanism, grinder arbor, feed mechanism, and grinder trimming mechanism. As these may be of any suitable construction, they are not illustrated or described in detail. In addition to these elements, the apparatus has two formed grinder wheels C and D, corresponding respectively to the interdental contour of the small and the large teeth of the gear, and these grinder wheels are adapted to be alternatively mounted on the grinder arbor. The grinder wheel C has a portion C' of its formed grinding surface corresponding to the contour of the small teeth B and is also provided with extended portions C² and C³ corresponding to the full addendum contour of the large teeth A. The width of this grinder must, however, correspond to the width of the interdental space for the small teeth, and consequently the surfaces C² and C³ are not spaced from each other to correspond to the interdental contour of the large teeth. On the other hand, the grinder D is trimmed to exactly correspond to the interdental contour of the large teeth, including not only the addendum portions thereof, but also the dedendum or root portions.

Method of grinding

When the work is properly adjusted on the work holder (not shown), the indexing mechanism is set to correspond to the circular pitch of the small teeth. The small teeth are then successively ground to size, indexing between successive grinding operations until all are ground. After the completion of the grinding of the last small tooth B', the machine is indexed two spaces, which brings the grinding surface C³ into operative relation to the large tooth A', so that the addendum surface of this tooth may also be ground to size. The machine is then indexed ten spaces, to bring the grinder wheel C into operative relation to the second tooth A², and the addendum surface E of this tooth is then ground to size. The machine is next indexed backward two and one-quarter spaces, which brings the central plane of the grinder C into registration with the central plane of the space between the teeth A' and A², after which the grinder wheel C is exchanged for the grinder wheel D. As this has the full interdental contour of the large teeth, including both the addendum and dedendum or root portions thereof, it may be used for completing the grinding of the adjacent faces of both teeth A' and A².

If, in the operations above described, the grinding of the addendum surface of the tooth A² were omitted, the full interdental contour of this tooth and the tooth A' might be ground with the grinder wheel D. However, it would be extremely difficult to limit the radial inward feeding movement of the grinder so as to exactly correspond to that for the grinder wheel C, and should there be any difference, the gears would not run smoothly. However, when the addendum surface E of the tooth A² is first ground to size, then the radial inward movement of the grinder D can be exactly limited to the point where it first contacts with this ground surface. This will perfectly blend the addendum and dedendum surfaces and will establish the inward limit for the grinding of all of the other large teeth.

My improved method as above specifically described may be generalized as follows:

Gears may be ground having any desired number of teeth with the same pitch diameter, but differing from each other in circular pitch by exact multiples. In each case the number of exchangeable grinder wheels corresponds to the number of different sizes of teeth. Also, in each case, the grinder wheel corresponding to the smaller teeth has its grinding surface extended to include the addendum contour of a larger tooth. This extended contour is used for first grinding the addendum portion of at least one of the larger teeth to provide a surface for limiting the subsequent grinding of all portions of the surface of the larger teeth. Also, this extended contour is used for grinding the addendum surface of any larger tooth where there is obstruction to the use of the larger grinder wheel.

It is obvious that my improved method could be carried out with other formed cutters than grinder wheels.

What I claim as my invention is:

1. The method of finishing gears of the type having the circular pitch of teeth in one segment thereof an exact multiple of the circular pitch of the teeth in another segment, the pitch diameter of all of said teeth being the same; comprising finishing all of the smaller teeth and also an addendum surface of at least one of the larger teeth with a cutter having a corresponding finished contour, finishing the larger teeth by the second cutter corresponding to the complete finished contour thereof, and setting the limit of cutting movement of said second cutter by said finished addendum contour.

2. The method of grinding gears of the type having the circular pitch of the teeth in one segment thereof an exact multiple of the circular pitch of the teeth in another segment, the pitch diameter of all of said teeth being the same; comprising grinding all of the smaller teeth by a formed grinder having the finished interdental contour of said teeth together with an extended surface having the finished addendum contour of the larger teeth, also grinding with said grinder an addendum surface of a larger tooth next adjacent to a smaller tooth, and an addendum surface of a second larger tooth, grinding the remaining unground surfaces of the larger teeth by a second formed grinder having the complete interdental contour of the larger teeth, and setting the limit of cutting movement of said second cutter by said finished addendum contour of said second larger tooth.

3. The method of finishing gears of the type having a circular pitch of the teeth in one segment thereof an exact multiple of the circular pitch of the teeth in another segment, the pitch diameter of all of said teeth being the same; comprising indexing by intervals corresponding to the smaller circular pitch and successively finishing all of the smaller teeth with a formed grinder having the finished interdental contour of said teeth together with an extended surface having the finished addendum contour of the larger teeth, indexing by a plurality of the same intervals to bring said grinder into registration with a larger tooth next adjacent to a smaller tooth, grinding an addendum surface of said larger tooth with said grinder wheel thus registered, indexing by an interval corresponding to said larger circular pitch to bring said grinder wheel into operative relation to a second larger tooth, grinding an addendum surface of said second tooth by said grinder, reverse-indexing to position said grinder in the central plane of the interdental space between said first and second teeth, exchanging said first grinder for a second formed grinder having the complete interdental contour of the larger teeth, grinding the unfinished portions of the interdental contour between said first and second larger teeth by said second grinder limited in its movement by said finished addendum surface, and grinding the interdental contour of all of the other larger teeth to the same limit by said second grinder.

ALFRED WALDMAN.